(12) United States Patent
Lu et al.

(10) Patent No.: US 11,822,811 B2
(45) Date of Patent: Nov. 21, 2023

(54) METHOD, ELECTRONIC DEVICE AND COMPUTER PROGRAM PRODUCT FOR PROCESSING DATA

(71) Applicant: EMC IP Holding Company LLC, Hopkinton, MA (US)

(72) Inventors: Yinlong Lu, Shanghai (CN); Haohan Zhang, Shanghai (CN); Yang Liu, Shanghai (CN); Dezheng Zhang, Shanghai (CN); Chen Bian, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 53 days.

(21) Appl. No.: 17/475,917

(22) Filed: Sep. 15, 2021

(65) Prior Publication Data
US 2022/0236908 A1    Jul. 28, 2022

(30) Foreign Application Priority Data
Jan. 22, 2021   (CN) .......................... 202110093823.3

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 8,762,476 B1   6/2014  Evans et al.
9,417,996 B2   8/2016  Fitzpatrick et al.
(Continued)

OTHER PUBLICATIONS

Introduction to Programming Infiniband RDMA; Insu Jang; Feb. 9, 2020; retrieved from https://web.archive.org/web/20201115150142/https://insujang.github.io/2020-02-09/introduction-to-programming-infiniband/ on Jan. 3, 2023 (Year: 2020).*
(Continued)

*Primary Examiner* — Daniel C. Chappell
(74) *Attorney, Agent, or Firm* — BainwoodHuang

(57) ABSTRACT

Techniques involve obtaining, at a first network interface card coupled with a first device, information related to a plurality of data blocks to be written to a second device, the information including sizes of the plurality of data blocks and a plurality of destination addresses in a memory of the second device where the plurality of data blocks will be written. The techniques further involve generating a write request for the plurality of data blocks based on the information, the write request indicating at least the plurality of destination addresses and the sizes of the plurality of data blocks. The techniques further involve sending the write request to a second network interface card coupled with the second device, so that the plurality of data blocks are written to the plurality of destination addresses. Such techniques reduce the number of communications thus improving system performance and reducing hardware resource consumption.

22 Claims, 6 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 18/00–41; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–6298; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 27/00–3293; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 9,922,039 | B1* | 3/2018 | Armangau | G06F 3/0683 |
| 10,531,592 | B1* | 1/2020 | Jau | G06F 3/0629 |
| 10,891,253 | B2* | 1/2021 | Raindel | G06F 13/4282 |
| 10,999,084 | B2 | 5/2021 | Yuan | |
| 11,188,375 | B2 | 11/2021 | Mansur et al. | |
| 2006/0045108 | A1* | 3/2006 | Blackmore | H04L 67/1097 370/402 |
| 2006/0056405 | A1* | 3/2006 | Chang | H04L 69/326 370/389 |
| 2008/0256292 | A1* | 10/2008 | Flynn | G06F 13/28 711/E12.04 |
| 2018/0307972 | A1* | 10/2018 | Feng | G06F 12/1009 |
| 2020/0050470 | A1* | 2/2020 | Guo | G06F 3/0659 |
| 2020/0133909 | A1* | 4/2020 | Hefty | G06F 13/28 |
| 2021/0021915 | A1* | 1/2021 | Liu | H04Q 11/0005 |
| 2022/0100432 | A1* | 3/2022 | Kim | G06F 9/45558 |

OTHER PUBLICATIONS

Definition of RDMA; PC Mag; Sep. 21, 2020; retrieved from https://web.archive.org/web/20200921172312/https://www.pcmag.com/encyclopedia/term/rdma on Jan. 3, 2023 (Year: 2020).*

Y. Chen et al., "HyQ: Hybrid I/O Queue Architecture for NVMe over Fabrics to Enable High-Performance Hardware Offloading," 2023 IEEE/ACM 23rd International Symposium on Cluster, Cloud and Internet Computing (CCGrid), Bangalore, India, 2023, pp. 13-24, doi: 10.1109/CCGrid57682.2023.00012. (Year: 2023).*

S. Ma, T. Ma, K. Chen and Y. Wu, "A Survey of Storage Systems in the RDMA Era," in IEEE Transactions on Parallel and Distributed Systems, vol. 33, No. 12, pp. 4395-4409, Dec. 1, 2022, doi: 10.1109/TPDS.2022.3188656. (Year: 2022).*

Y. Yuan et al., "Rambda: RDMA-driven Acceleration Framework for Memory-intensive μs-scale Datacenter Applications," 2023 IEEE International Symposium on High-Performance Computer Architecture (HPCA), Montreal, QC, Canada, 2023, pp. 499-515, doi: 10.1109/HPCA56546.2023.10071127. (Year: 2023).*

* cited by examiner

| Bit<br>Byte | 31-24 | 23-16 | 15-8 | 7-0 |
|---|---|---|---|---|
| 0-3 | Flag bit | | Reserve | Sub-header number |
| 4-7 | Total size | | | |
| 8-23 | Sub-header 0 | | | |
| 24-39 | Sub-header 1 | | | |
| ... ... | ... ... | | | |
| 16*N+8-16*(N+1)+7 | Sub-header N | | | |

500 ⤴

| Bit<br>Byte | 31-24 | 23-16 | 15-8 | 7-0 |
|---|---|---|---|---|
| 0-3 | Virtual address (63-32) ||||
| 4-7 | Virtual address (31-0) ||||
| 8-11 | Key ||||
| 12-15 | Flag | Reserve | Fill | DMA length |

| Code [7-5 Bit] | Code [4-0 Bit] | Description | Content following basic transport header |
|---|---|---|---|
| 110<br>Reliable<br>connection | 00000 | Write request | Header |
| | 00001 | First part of write operation | Header, payload |
| | 00010 | Middle part of write operation | Payload |
| | 00011 | Last part of write operation | Payload |
| | 00100 | Last part of write operation with immediate operation | Payload and immediate operation |
| | ...... | | |

FIG. 6

METHOD, ELECTRONIC DEVICE AND COMPUTER PROGRAM PRODUCT FOR PROCESSING DATA

CROSS-REFERENCE TO RELATED APPLICATION

This application claims priority to Chinese Patent Application No. CN202110093823.3, on file at the China National Intellectual Property Administration (CNIPA), having a filing date of Jan. 22, 2021, and having "METHOD, ELECTRONIC DEVICE AND COMPUTER PROGRAM PRODUCT FOR PROCESSING DATA" as a title, the contents and teachings of which are herein incorporated by reference in their entirety.

TECHNICAL FIELD

Embodiments of the present disclosure relate to the field of data processing, and more particularly, to a method, an electronic device, and a computer program product for processing data.

BACKGROUND

With the development of data access technologies between remote computing devices, a new Remote Direct Memory Access (RDMA) technology has been proposed. RDMA allows the computing devices to write data directly to a memory of a target computer through a network without any impact on operating systems of the two computing devices.

The principle of the RDMA technology is to offload data access operations performed by the computing devices to a local network interface card coupled with the computing devices for execution. During the operations of RDMA, the network interface card coupled with the local computing device controls to send data to a network interface card of a target computer to achieve access to a memory of the target computing device. However, there are still many problems during the operations of RDMA to be solved.

SUMMARY OF THE INVENTION

Embodiments of the present disclosure provide a method, an electronic device, and a computer program product for processing data.

According to a first aspect of the present disclosure, a method for processing data is provided. The method includes obtaining, at a first network interface card coupled with a first device, information related to a plurality of data blocks to be written to a second device, wherein the information includes sizes of the plurality of data blocks and a plurality of destination addresses in a memory of the second device where the plurality of data blocks will be written. The method further includes generating a write request for the plurality of data blocks based on the information, wherein the write request indicates at least the plurality of destination addresses and the sizes of the plurality of data blocks. The method further includes sending the write request to a second network interface card coupled with the second device, so that the plurality of data blocks are written to the plurality of destination addresses.

According to a second aspect of the present disclosure, a method for processing data is provided. The method includes receiving, at a second network interface card coupled with a second device, a write request for a plurality of data blocks from a first network interface card coupled with a first device, wherein the write request at least indicates sizes of the plurality of data blocks and a plurality of destination addresses in a memory of the second device where the plurality of data blocks will be written. The method further includes based on the plurality of sizes, writing the plurality of data blocks to the plurality of destination addresses.

According to a third aspect of the present disclosure, an electronic device is provided. The electronic device includes at least one processor; and a memory coupled to the at least one processor and having instructions stored thereon, wherein when executed by the at least one processor, the instructions cause the device to perform actions, and the actions include: obtaining, at a first network interface card coupled with a first device, information related to a plurality of data blocks to be written to a second device, wherein the information includes sizes of the plurality of data blocks and a plurality of destination addresses in a memory of the second device where the plurality of data blocks will be written; generating a write request for the plurality of data blocks based on the information, wherein the write request indicates at least the plurality of destination addresses and the sizes of the plurality of data blocks; and sending the write request to a second network interface card coupled with the second device, so that the plurality of data blocks are written to the plurality of destination addresses.

According to a fourth aspect of the present disclosure, an electronic device is provided. The electronic device includes at least one processor; and a memory coupled to the at least one processor and having instructions stored thereon, wherein when executed by the at least one processor, the instructions cause the device to perform actions, and the actions include: receiving, at a second network interface card coupled with a second device, a write request for a plurality of data blocks from a first network interface card coupled with a first device, wherein the write request at least indicates sizes of the plurality of data blocks and a plurality of destination addresses in a memory of the second device where the plurality of data blocks will be written; and based on the plurality of sizes, writing the plurality of data blocks to the plurality of destination addresses.

According to a fifth aspect of the present disclosure, a computer program product is provided. The computer program product is tangibly stored on a non-volatile computer-readable medium and includes machine-executable instructions, wherein when executed, the machine-executable instructions cause a machine to perform steps of the method in the first aspect of the present disclosure.

According to a sixth aspect of the present disclosure, a computer program product is provided. The computer program product is tangibly stored in a non-volatile computer-readable medium and including machine-executable instructions, wherein when executed, the machine-executable instructions cause a machine to perform steps of the method in the second aspect of the present disclosure.

BRIEF DESCRIPTION OF THE DRAWINGS

The above and other objects, features, and advantages of the present disclosure will become more apparent by describing the example embodiments of the present disclosure in more detail in combination with the accompanying drawings. In the example embodiments of the present disclosure, the same reference numerals generally represent the same parts.

FIG. 5 illustrates a schematic diagram of example 500 of a sub-header according to an embodiment of the present disclosure;

FIG. 6 illustrates a schematic diagram of example 600 of an operation code according to an embodiment of the present disclosure;

The same or corresponding reference numerals in the drawings represent the same or corresponding portions.

DETAILED DESCRIPTION

Figure 1:
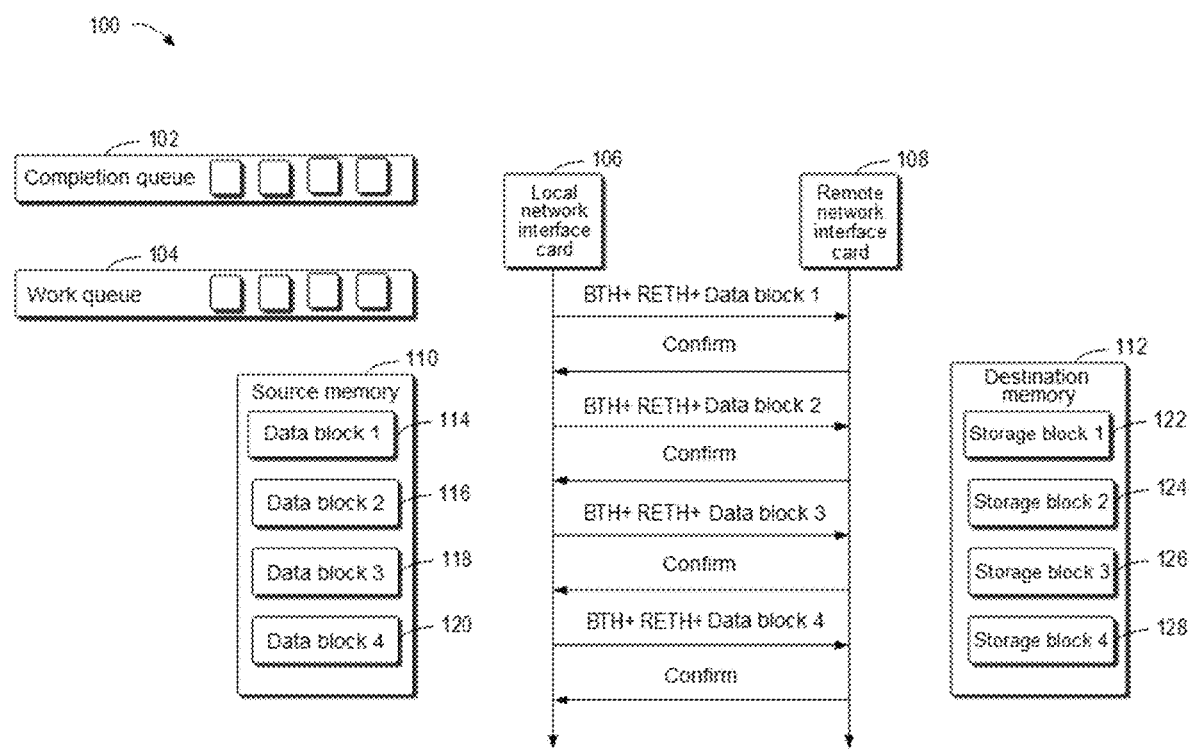
FIG. 1 illustrates a flowchart of process 100 for performing remote direct memory access to data in a conventional solution.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Embodiments of the present disclosure will be described in more detail below with reference to the accompanying drawings. Although some embodiments of the present disclosure are illustrated in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and embodiments of the present disclosure are for illustrative purposes only, and are not intended to limit the scope of protection of the present disclosure.

In the description of the embodiments of the present disclosure, the term "include" and similar terms thereof should be understood as open-ended inclusion, i.e., "including but not limited to." The term "based on" should be understood as "based at least in part on." The term "one embodiment" or "the embodiment" should be understood as "at least one embodiment." The terms "first," "second," etc. may refer to different or the same objects. Other explicit and implicit definitions may also be included below.

The principles of the present disclosure will be described below with reference to several example embodiments shown in the accompanying drawings. Although preferred embodiments of the present disclosure are shown in the accompanying drawings, it should be understood that these embodiments are described only to enable those skilled in the art to better understand and then implement the present disclosure, and are not intended to impose any limitation to the scope of the present disclosure.

In some card designs, a Non-Transparent Bridge (NTB) is used for underlying transport. It provides remote Direct Memory Access (DMA) between Storage Processors (SPs). Through the non-transparent bridge, data from the SPs are bundled together and then transmitted to a separate target address on a remote SP, and many pieces of data are usually small in size.

In NTB, a manner of transmitting data to only one target address at once does not show poor performance. As storage processors connected through a non-transparent bridge are usually connected through the same physical card, these data transmissions are like memory accesses without additional overheads between SPs. However, when RDMA is used instead of NTB for underlying transport, the performance will deteriorate. A lot of network communication overheads are involved during the transmission of these bundled data.

Currently, in the case of RDMA write operations, the RDMA technology only supports a Scatter Gather List (SGL) locally. This means that a user may write source data specified by the scatter/gather list to a single remote address. With this design, when a data packet is written to multiple remote destination addresses in a RDMA manner, the data packet can only be divided into multiple data blocks according to the different destination addresses to be used for storage, and then the multiple data blocks are written to multiple different remote addresses by using different RDMA write operations.

As shown in FIG. 1, when RDMA operations are used to write data block 1 114, data block 2 116, data block 3 118, and data block 4 120 located at four different addresses to storage block 1 122, storage block 2 124, storage block 3 126, and storage block 4 128 corresponding to four different destination addresses, four work queue elements need to be generated in work queue 104. Each work queue element includes at least a data block source address, the destination address of a storage block where the data block will be stored, and the size of the data block or the length of data. A RDMA operation is performed for each work queue element, and a data block is written to a corresponding storage block. For each work queue element, a corresponding data block is obtained based on the source address of the data block, and a RDMA write request is generated by combining RDMA Extended Transport Header (RETH) and Base Transport Header (BTH) with other headers. For example, if an InfiniBand (IB) network is used for transport, the other headers may be Local Route Headers (LRHs) and Global Route Headers (GRHs). If a conventional network is used, the other headers may be Ethernet or TCP/IP headers.

Then local network interface card 106 transmits each RDMA write request to remote network interface card 108 in order to write data block 1 114, data block 2 116, data block 3 118, and data block 4 120 in source memory 110 to storage block 1 122, storage block 2 124, storage block 3 126, and storage block 4 128 of destination memory 112. For each RDMA write request, remote network interface card 108 will send a confirmation message to a local network interface card. After the confirmation message indicates that the data blocks are received and processed by a function, local network interface card 106 generates a completion queue element and puts it into completion queue 102 in order to notify an upper application that writing of the data blocks is completed.

Therefore, in this process, at least 4 round-trip communications are required to complete data transmission of all these 4 data blocks, and additional resources are required to process 4 work queue elements and 4 completion queue elements.

In the case of many small data blocks to be written to the destination memory, this manner will cause serious performance problems. Compared with pure load transport, a large amount of communication overheads will deteriorate system performance.

In order to solve the above and other potential problems, an embodiment of the present disclosure provides a method for processing data. In this method, a network interface card obtains information related to a plurality of data blocks to be written to a second device, wherein the information includes sizes of the plurality of data blocks and a plurality of destination addresses in a memory of the second device where the plurality of data blocks will be written. Then, the obtained information is used to generate, at the network interface card, a write request for the plurality of data blocks, wherein the write request at least indicates the plurality of destination addresses and the sizes of the plurality of data blocks. Then, the network interface card sends the write request to a second network interface card coupled with the second device, so that the plurality of data blocks are written to the plurality of destination addresses. Through this method, by reducing the number of communications, system performance may be improved, and consumption of hardware resources may be reduced.

Figure 2:
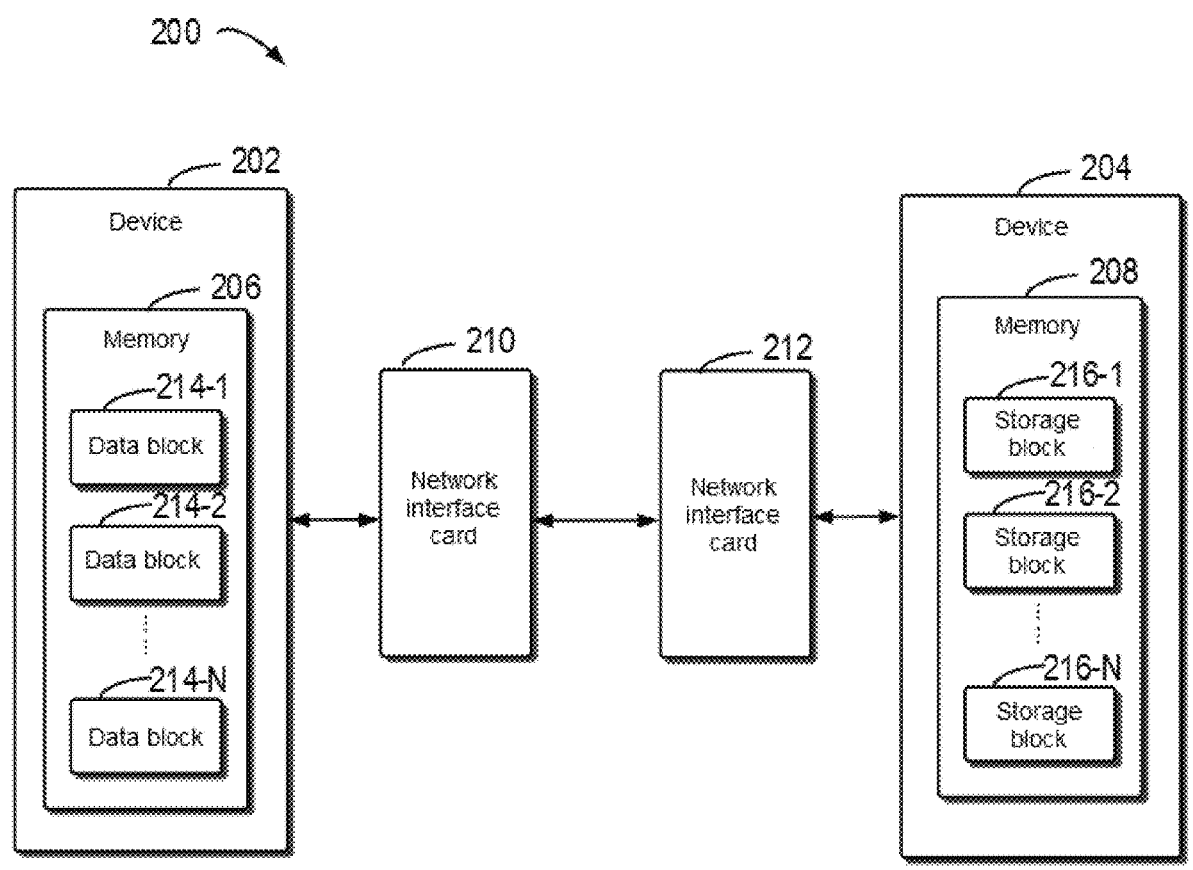
FIG. 2 illustrates a schematic diagram of example environment 200 in which a device and/or a method according to an embodiment of the present disclosure may be implemented.

The embodiments of the present disclosure will be further described below in detail with reference to the accompanying drawings. FIG. 2 illustrates a block diagram of example system 200 in which an embodiment of the present disclosure can be implemented. It should be understood that the structure of system 200 is described for illustrative purposes only and does not imply any limitation to the scope of the present disclosure.

System 200 includes device 202 and device 204. For ease of description, device 202 may also be referred to as a first device, and device 204 may also be referred to as a second device. Device 202 and device 204 include, but are not limited to, a personal computer, a server computer, a handheld or laptop device, a mobile device (such as a mobile phone, a personal digital assistant (PDA), and a media player), a multi-processor system, a consumer electronic product, a minicomputer, a mainframe computer, a distributed computing environment including any of the above systems or devices, etc.

Device 202 has memory 206. Memory 206 stores data blocks 214-1, 214-2, . . . , 214-N to be stored in memory 208 of device 204, where N is a positive integer. For convenience of description, each of data blocks 214-1, 214-2, . . . , 214-N is referred to as data block 214. The N data blocks 214 will be stored in N storage blocks of memory 206.

Device 202 generates an element in a work queue based on the source addresses, destination addresses, and data block lengths of data blocks 214 to be stored in storage blocks 216-1, 216-2, . . . , 216-N in device 204. In addition to the aforementioned factors, device 202 may additionally generate the element based on other information such as a data carrying identifier. The data carrying identifier is an identifier that indicates whether a generated write request includes a plurality of data blocks.

Network interface cards 210 and 212 are respectively coupled to corresponding device 202 and device 204. For convenience of description, network interface card 210 may be referred to as a first network interface card, and network interface card 212 may be referred to as a second network interface card. In one example, the coupling is a wired connection. In one example, the coupling is achieved through a slot connection. The above examples are only used for describing the present disclosure, rather than specifically limiting the present disclosure.

The coupling of network interface cards 210 and 212 to corresponding device 202 and device 204 respectively is only an example, and is not a specific limitation to the present disclosure. In some embodiments, network interface cards 210 and 212 are included in device 202 and device 204, respectively.

In some embodiments, network interface cards 210 and 212 are implemented through physical hardware. In some embodiments, network interface cards 210 and 212 are implemented through software. The above examples are only used for describing the present disclosure, rather than specifically limiting the present disclosure.

Then, network interface card 210 generates a write request, for example, a RDMA write request, based on the work queue element in order to write the plurality of data blocks 214 to storage blocks 216 of memory 208 in device 204.

The write request generated by network interface card 210 includes a header including a plurality of headers corresponding to the plurality of data blocks and the total size of the plurality of data blocks. The sub-headers includes a destination address corresponding to one of the plurality of data blocks and a size thereof. First network interface card 210 sends the generated write request to second network interface card 212 for storing the plurality of data blocks in memory 208 of device 204.

When the data blocks are required to be transported, network interface card 210 obtains data blocks 214 by directly accessing memory 206 using the source addresses thereof. Then, the obtained data blocks 214 are sent to second network interface card 212 together with the write request or through a payload data packet in the write operation. Second network interface card 212 buffers the received data blocks in storage blocks in second network interface card 212. Then, second network interface card 212 stores, through direct memory access, the received data blocks in the storage block in memory 208 as indicated by the destination address.

Through the above method, application migration efficiency may be improved, the use of network resources and computing resources may be reduced, and data processing efficiency and user experience may be improved.

The foregoing describes, with reference to FIG. 2, a block diagram of example system 200 in which an embodiment of the present disclosure can be implemented. The following describes, with reference to FIG. 3, a flowchart of method 300 for processing data according to an embodiment of the present disclosure. Method 300 may be implemented at network interface card 210 in FIG. 2 or at any suitable computing device.

At block 302, first network interface card 210 obtains information related to the plurality of data blocks 214 to be written to second device 204, wherein the information includes the sizes of the plurality of data blocks 214 and a plurality of destination addresses in memory 208 of second device 204 where the plurality of multiple data blocks 214 will be written.

In some embodiments, when the write operation is performed, an application in first device 202 generates a work queue element as storing the plurality of data blocks to a plurality of different destination addresses in memory 208 of second device 204 is required. Then, the work queue element is put into a work queue. Then, network interface card 210 obtains the work queue element from the work queue.

In some embodiments, the work queue element includes information related to the plurality of data blocks. The information includes the source storage address, the destination storage location, and the data block size or the data length of each data block in the plurality of data blocks. Alternatively or additionally, the work queue element also includes a data carrying identifier, wherein the data carrying identifier indicates whether the write request sent by a network interface card includes a plurality of data blocks. The above examples are only used for describing the present disclosure, rather than specifically limiting the present disclosure. The work queue element may include any appropriate information.

In some embodiments, the work queue element includes an indication of the storage location of a storage area where the above-mentioned information is located. Network interface card 210 obtains an indication of the storage location of the information in the first device from the work queue element. For example, the work queue element stores a pointer to the storage location of the information. Then, network interface card 210 obtains information from the storage location based on the indication. Through this method, the network interface card may quickly obtain information, and the amount of the information may be adjusted as needed.

At block 304, first network interface card 210 generates a write request for the plurality of data blocks based on the information, wherein the write request at least indicates a plurality of destination addresses and the sizes of the plurality of data blocks.

In some embodiments, first network interface card 210 obtains a data carrying identifier from first device 202, wherein the data carrying identifier indicates whether the write request includes a plurality of data blocks. For example, the network interface card obtains the data carrying identifier from a work queue element. Then, first network interface card 210 determines whether to carry the plurality of data blocks in the sent write request based on the data carrying identifier.

If the data carrying identifier indicates that the write request does not include the plurality of data blocks, first network interface card 210 generates a write request by using the plurality of destination addresses, the plurality of sizes, and the number of the plurality of data blocks. The write request includes a header including a plurality of sub-headers corresponding to the plurality of data blocks and a total size of the plurality of data blocks. The sub-headers include a destination address corresponding to one of the plurality of data blocks and a size thereof. Through this method, the write request may carry a plurality of destination addresses, which speeds up data storage, reduces the number of communications, and improves system performance.

Figures 3, 4:
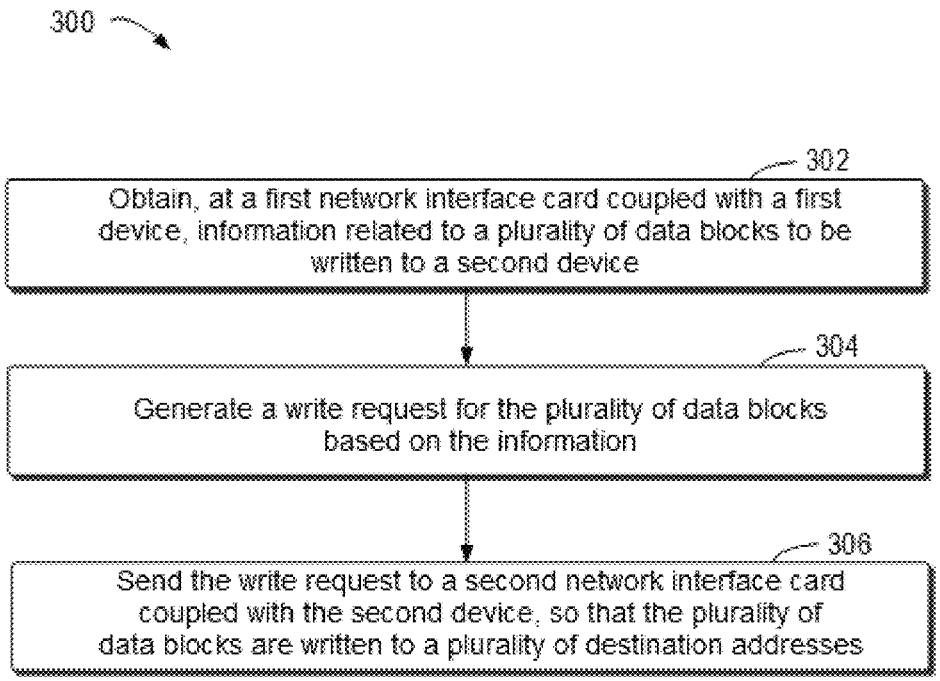
FIG. 3 illustrates a flowchart of method 300 for processing data according to an embodiment of the present disclosure.
FIG. 4 illustrates a schematic diagram of example 400 of a header according to an embodiment of the present disclosure.

The following describes the header and the sub-headers with reference to FIG. 4 and FIG. 5. FIG. 4 illustrates example 400 of a header according to an embodiment of the present disclosure. For example, the header may be called a RDMA Multiple New Extended Transport Header (RMNETH).

The header includes a flag bit field, a reserved field, a sub-header number field, a total size field of the plurality of data blocks, and N sub-headers, where the flag field may be used to support some advanced functions. For example, it may be possible to identify whether a wash operation is supported, such as indicating whether to perform a wash operation on a data block before sending a confirmation message of having received data in order to ensure persistent storage of the data. The above examples are only used for describing the present disclosure, rather than specifically limiting the present disclosure. Those skilled in the art may set a function indicated by the flag bit as required.

The reserved field in the header is used to reserve some data bits for future functions. The header structure shown in FIG. 4 is only an example, rather than a specific limitation to the present disclosure. Those skilled in the art may adjust or set the format of the header and adjust the size of each field as needed, for example, add or remove a field, such as adding a version field.

FIG. 5 illustrates a schematic diagram of example 500 of a sub-header according to an embodiment of the present disclosure. The sub-header may be called a RDMA New Extended Transport Header (RNETH).

As shown in FIG. 5, the sub-header includes 16 bytes, where a virtual address is used to store a destination address. The sub-header also includes a key field, and the key field is used for performing a verification in the destination memory to determine whether the memory where the destination address is located may be operated. The sub-header also includes a flag field, a reserved field, a filling field used to enable a transported data block to conform to a specified length, and the length of a data block to be transported. The length of the data block to be transported is also called a DMA length.

The flag field may be used to support certain advanced functions, such as merge operations. Through the merge operations, a complex command may be created by "merging" several simpler 10 commands together, which are specified by the sub-header. This flag field may be used to define a first/middle/last command in a merge operation. A sub-header structure shown in FIG. 6 is only an example, rather than a specific limitation to the present disclosure. Those skilled in the art may adjust or set the format of the header and adjust the size of each field as needed, for example, add or remove a field.

Now return to FIG. 3 to continue the description. In some embodiments, first network interface card 210 generates a write request when it is determined that a data carrying identifier indicates that the write request includes a plurality of data blocks. The write request includes a header and the plurality of data blocks. In this way, the plurality of data blocks may be carried in the write request, thereby reducing the number of data transmission.

At block 306, first network interface card 210 sends a write request to a second network interface card coupled with a second device, so that the plurality of data blocks are written to a plurality of destination addresses.

In some embodiments, if the write request includes a plurality of data blocks, when second network interface card 212 receives the write request, and successfully allocates a storage block corresponding to the total size in the header for the write request in order to store the plurality of data blocks, a confirmation message that the write request is successfully received may be transmitted to the first network interface card.

In some embodiments, if the write request does not include a plurality of data blocks, when second network interface card 212 receives the write request, and successfully allocates a storage block corresponding to the total size in the header for the write request, a confirmation message that the write request is successfully received may be transmitted to first network interface card 210. After receiving the confirmation message, first network interface card 210 sends the plurality of data blocks to second network interface card 212. If the sizes of the plurality of data blocks do not exceed a maximum transport unit, the plurality of data blocks are transmitted to second network interface card 212 through one write operation. If the maximum transport unit is exceeded, the plurality of data blocks are sent through two or more write operations.

FIG. 6 illustrates example 600 of an operation code that determines the content in a write request or a write operation. The operation code is included in a basic transport header BTH which is set in front of a header shown in FIG. 4. The operation code is used to indicate the content following the basic transport header. For example, if the 5th to 7th bits of the operation code are 110, it indicates that the connection in the network is a reliable connection. When the 0th to 4th bits in the operation code are 00000, it means that what is transported is a write request, and the content following the basic transport header is the header shown in FIG. 4. If the 0th to 4th bits are 00001, it indicates that what is transported is a first part of the write operation, and the content following the basic transport header is the header and the plurality of data blocks as the payload. If the header in FIG. 4 and the plurality of data blocks are transported separately, the 0th to 4th bits in the operation code being 00010 and 00011 may be used to identify different parts of the transmitted data blocks. The 0th to 4th bits in the operation code being 00100 may also be used to identify the payload and the corresponding immediate operation. It should be noted that what is shown in FIG. 6 is only an example of an operation code, rather than a specific limitation on the present disclosure. Those skilled in the art may set the format of the operation code and the specific content corresponding to the operation code as required.

Now return to FIG. 3 to continue the description. If first network interface card 210 receives a confirmation message for the plurality of data blocks 214 from second device 204, first network interface card 210 provides completion information, indicating that the plurality of data blocks are written to second device 204, to first device 202. Alternatively or additionally, if a data block is sent to second network interface card 212 through a plurality of write operations, a corresponding confirmation message is sent after sending each write operation. Through this method, data may be accurately transmitted to the second network interface card.

In some embodiments, network interface card 210 obtains the plurality of source addresses of the plurality of data blocks in the memory of the first device, for example, from a work queue element. Based on the plurality of source addresses, network interface card 210 obtains the plurality of data blocks by performing a direct memory access operation.

Through the above method, application migration efficiency may be improved, the use of network resources and computing resources may be reduced, and data processing efficiency and user experience may be improved.

The foregoing describes, in conjunction with FIG. 3 to FIG. 6, a flowchart of method 300 for processing data according to an embodiment of the present disclosure. The following describes, in conjunction with FIG. 7, a flowchart of method 700 for processing data according to an embodiment of the present disclosure. Method 700 may be implemented at second network interface card 212 in FIG. 2 or at any suitable computing device.

At block 702, second network interface card 212 receives, at a second network interface card coupled with a second device, a write request for a plurality of data blocks from a first network interface card coupled with a first device, wherein the write request at least indicates sizes of the plurality of data blocks and a plurality of destination addresses in memory 208 of second device 204 where the plurality of data blocks will be written;

In some embodiments, second network interface card 212 obtains a plurality of sub-headers corresponding to the plurality of data blocks and a total size of the plurality of data blocks from one header of the write request. Then, second network interface card 212 obtains a destination address corresponding to one of the plurality of data blocks and a size thereof from each sub-header of the plurality of sub-headers. Network interface card 211 allocates a storage block corresponding to the total size. In this way, the storage location of data may be determined quickly and accurately, and the plurality of data blocks may be stored to a plurality of different destination addresses.

In some embodiments, second network interface card 212 determines whether a write request includes a plurality of data blocks. If network interface card 212 determines that the write request includes a plurality of data blocks, network interface card 212 reads the plurality of data blocks from the write request. Second network interface card 212 writes the plurality of data blocks to the storage block. In this way, the plurality of data blocks may be quickly obtained, and data block acquisition efficiency is improved.

In some embodiments, if network interface card 212 determines that the write request does not include a plurality of data blocks, network interface card 212 sends a confirmation message for the write request to first network interface card 210. Then, network interface card 212 receives the plurality of data blocks from first network interface card 210 in order to store in the storage blocks in network interface card 212. If the plurality of data blocks are stored in the storage blocks, network interface card 212 sends a confirmation message for the multiple data blocks to first network interface card 210 in order to indicate that the data blocks are successfully received. In this way, a large number of data blocks may be quickly transported to network interface card 212 to achieve rapid data storage.

At block 704, based on a plurality of sizes, second network interface card 212 writes the plurality of data blocks to a plurality of destination addresses. The size of each data block is used to determine each data block from the received data, and then the data block is written to memory 208.

In some embodiments, second network interface card 212 writes the plurality of data blocks to a plurality of destination addresses, for example, a plurality of storage blocks corresponding to the plurality of destination addresses, in memory 208 of second device 204 through a direct memory access operation. In this way, data storage may be accelerated without consuming computing resources of the computing device.

Through the above method, application migration efficiency may be improved, the use of network resources and computing resources may be reduced, and data processing efficiency and user experience may be improved.

Figure 7:
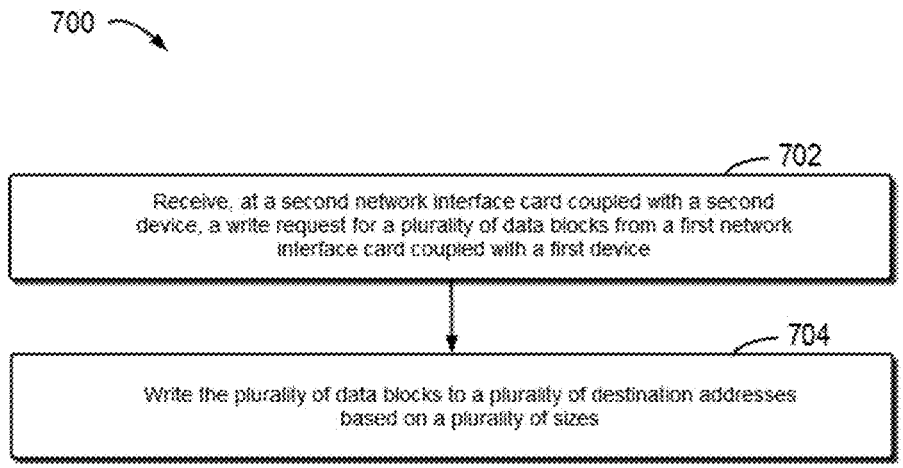
FIG. 7 illustrates a flowchart of method 700 for processing data according to an embodiment of the present disclosure.

The foregoing describes, in conjunction with FIG. 7, a flowchart of method 700 for processing data according to an embodiment of the present disclosure. The following describes, in conjunction with FIG. 8, a flowchart of example process 800 for performing remote direct memory access to data according to an embodiment of the present disclosure. Process 800 may be performed at first network interface card 210 and second network interface card 212 in FIG. 2 and at any suitable computing device.

Figure 8:
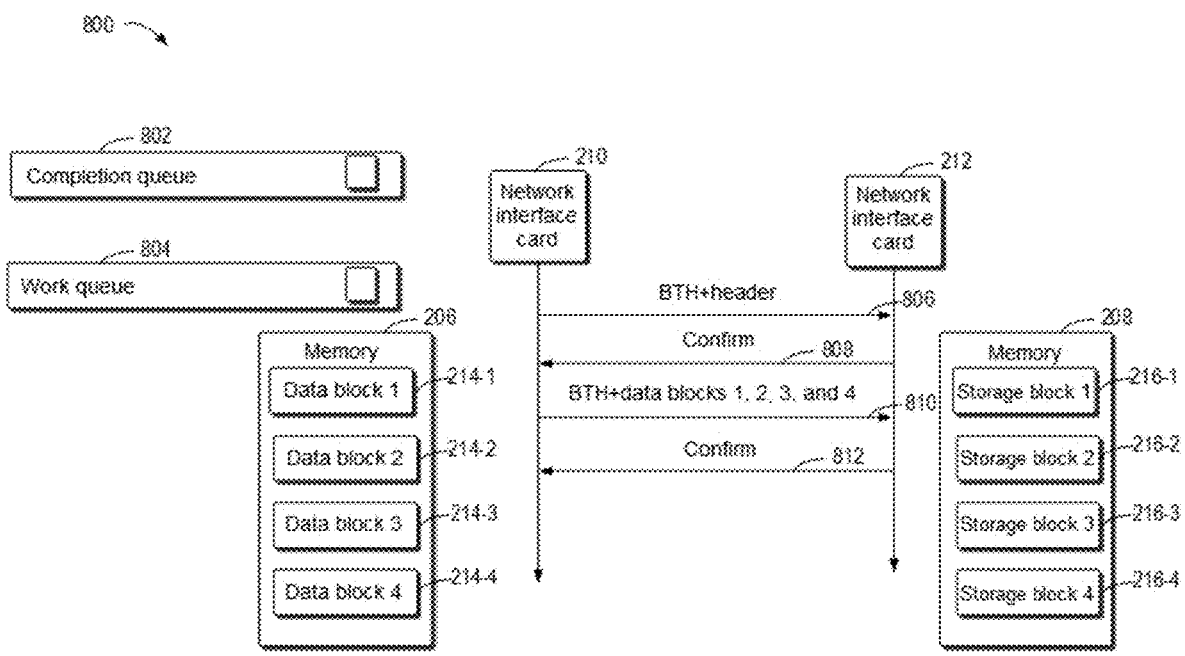
FIG. 8 illustrates a flowchart of example process 800 for performing remote direct memory access to data according to an embodiment of the present disclosure.

As shown in FIG. 8, a first device puts a work queue element into work queue 804. From the work queue element, information related to data block 1 214-1, data block 2 214-2, data block 3 214-3, and data block 4 214-4 may be obtained. The information includes the source addresses of data block 1 214-1, data block 2 214-2, data block 3 214-3, and data block 4 214-4 in memory 206, the destination addresses of storage block 1 216-1, storage block 2 216-2, storage block 3 216-3, and storage block 4 216-4 in memory 208 where the data blocks will be sent, and the lengths of the data blocks. The work queue element also indicates that the data blocks are sent separately from the header.

Network interface card 210 generates a header based on the obtained information, and the header is shown in FIG. 4. A write request is formed by combining the header with a basic transport header BTH and other network protocol headers. Then, the write request is sent (806) to network interface card 212.

Then, based on the received write request, network interface card 212 allocates, in the memory in network interface card 212, a storage block equivalent to the total size of the data blocks. If the storage block is allocated successfully, a confirmation message for the write request may be sent (808) to first network interface card 210, for example, the confirmation message indicates that the write request is successfully processed. The network interface card then sends data block 1 214-1, data block 2 214-2, data block 3 214-3, and data block 4 214-4 (810) to second network interface card 212. Second network interface card 212 stores the received data blocks in the allocated storage blocks. Second network interface card 212 sends (812) a confirmation message that the data blocks are received to first network interface card 210. Then, second network interface card 212 performs a direct memory access operation so as to write the data blocks to storage block 1 216-1, storage block 2 216-2, storage block 3 216-3, and storage block 4 216-4. In addition, after first network interface card 210 receives, from second network interface card 212, a confirmation message that a plurality of data blocks are successfully received, a completion queue element is generated and put into completion queue 802 in order to indicate that storage of the data blocks is completed.

Through this method, by reducing the number of communications, system performance may be improved, and consumption of hardware resources may be reduced.

Figure 9:
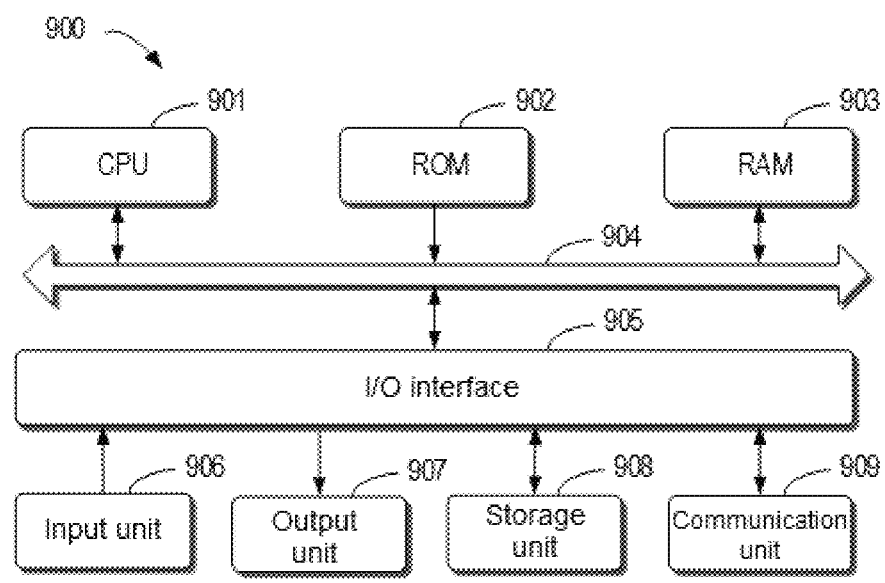
FIG. 9 illustrates a schematic block diagram of example device 900 applicable to implementing an embodiment of the present disclosure.

FIG. 9 illustrates a schematic block diagram of example device 900 which may be configured to implement an embodiment of the present disclosure. Device 900 may be used to implement first network interface card 210 and/or second network interface card 212 in FIG. 2. As shown in the figure, device 900 includes central processing unit (CPU) 901 which may perform various appropriate actions and processings according to computer program instructions stored in read-only memory (ROM) 902 or computer program instructions loaded from storage page 908 into random access memory (RAM) 903. Various programs and data required by the operation of device 900 may also be stored in RAM 903. CPU 901, ROM 902, and RAM 903 are connected to one another through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage page 908, such as a magnetic disk and an optical disc; and communication unit 909, such as a network card, a modem, and a wireless communication transceiver. Communication unit 909 allows device 900 to exchange information/data with other devices through a computer network such as the Internet and/or various telecommunication networks.

The various processes and processings described above, for example, methods 200, 700, and 800, may be performed by processing unit 901. For example, in some embodiments, methods 200, 700, and 800 may be implemented as a computer software program that is tangibly included in a machine-readable medium, such as storage page 908. In some embodiments, part or all of the computer program may be loaded and/or installed onto device 900 via ROM 902 and/or communication unit 909. When the computer program is loaded onto RAM 903 and executed by CPU 901, one or more actions of methods 200, 700, and 800 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages. The programming languages include an object oriented programming language, such as Smalltalk, C++, and the like, and a conventional procedural programming language, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any type of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flowcharts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, or to enable other persons of ordinary skill in the art to understand the embodiments disclosed herein.

The invention claimed is:

1. A method for processing data, comprising:
   obtaining, at a first network interface card coupled with a first device, information related to a plurality of data blocks to be written to a second device, wherein the information comprises sizes of the plurality of data blocks and a plurality of destination addresses in a memory of the second device where the plurality of data blocks will be written;
   generating a write request for the plurality of data blocks based on the information, wherein the write request indicates at least the plurality of destination addresses and the sizes of the plurality of data blocks; and
   sending the write request to a second network interface card coupled with the second device, so that the plurality of data blocks are written to the plurality of destination addresses in the memory of the second device;
   wherein generating the write request comprises:
     obtaining a data carrying identifier, wherein the data carrying identifier indicates whether the write request comprises the plurality of data blocks; and
     in response to the data carrying identifier indicating that the write request comprises the plurality of data blocks, creating the write request, wherein the write request comprises a header and the plurality of data blocks;
   wherein the header comprises a number of sub-headers and a total size of the plurality of data blocks, and each of the sub-headers comprises a destination address corresponding to one of the plurality of data blocks and a size thereof; and
wherein creating the write request includes:
  performing a merge operation that combines multiple preexisting write requests into the write request, wherein each of the sub-headers indicates one of the multiple preexisting write requests, and each of the multiple preexisting write requests indicates one of the plurality of data blocks.

2. The method according to claim 1, wherein obtaining the information comprises:
  obtaining an indication about the storage location of the information in the first device; and
  obtaining the information from the storage location based on the indication.

3. The method according to claim 1, further comprising:
  if a confirmation message for the write request from the second device is received, sending the plurality of data blocks to the second device; and
  if a confirmation message for the plurality of data blocks from the second device is received, providing completion information, indicating that the plurality of data blocks are written to the second device, to the first device.

4. The method according to claim 1, further comprising:
  obtaining a plurality of source addresses, in a memory of the first device, of the plurality of data blocks; and
  based on the plurality of source addresses, obtaining the plurality of data blocks by performing a direct memory access operation.

5. A method for processing data, comprising:
  receiving, at a second network interface card coupled with a second device, a write request for a plurality of data blocks, wherein the write request is received from a first network interface card coupled with a first device and at least indicates sizes of the plurality of data blocks and a plurality of destination addresses in a memory of the second device where the plurality of data blocks will be written; and
  based on the sizes of the plurality of data blocks, writing the plurality of data blocks to the plurality of destination addresses in the memory of the second device;
wherein the write request was generated by:
  obtaining a data carrying identifier, wherein the data carrying identifier indicates whether the write request comprises the plurality of data blocks; and
  in response to the data carrying identifier indicating that the write request comprises the plurality of data blocks, creating the write request, wherein the write request comprises a header and the plurality of data blocks;
wherein the header comprises a number of sub-headers and a total size of
  the plurality of data blocks, and each of the sub-headers comprises a destination address corresponding to one of the plurality of data blocks and a size thereof; and
wherein the write request was further created by:
  performing a merge operation that combines multiple preexisting write requests into the write request, wherein each of the sub-headers indicates one of the multiple preexisting write requests, and each of the multiple preexisting write requests indicates one of the plurality of data blocks.

6. The method according to claim 5, wherein receiving the write request comprises:
  obtaining a plurality of sub-headers corresponding to the plurality of data blocks and a total size of the plurality of data blocks from one header of the write request;
  obtaining a destination address corresponding to one of the plurality of data blocks and a size thereof from each sub-header of the plurality of sub-headers; and
  allocating a storage block corresponding to the total size.

7. The method according to claim 6, further comprising:
  determining whether the write request comprises the plurality of data blocks; and
  if it is determined that the write request comprises the plurality of data blocks, obtaining the plurality of data blocks from the write request; and
  writing the plurality of data blocks to the storage block.

8. The method according to claim 6, the method further comprising:
  if it is determined that the write request does not comprise the plurality of data blocks, sending a confirmation message for the write request to the first network interface card; and
  receiving the plurality of data blocks from the first network interface card in order to store in the storage block; and
  if the plurality of data blocks are stored in the storage block, sending a confirmation message for the plurality of data blocks to the first network interface card.

9. The method according to claim 5, wherein writing the plurality of data blocks to the plurality of destination addresses comprises:
  writing the plurality of data blocks to the plurality of destination addresses in the memory of the second device through a direct memory access operation.

10. An electronic device, the electronic device comprising:
  at least one processor; and
  a memory coupled to the at least one processor and having instructions stored thereon, wherein when executed by the at least one processor, the instructions cause the electronic device to perform actions, and the actions comprise:
    obtaining, at a first network interface card coupled with a first device, information related to a plurality of data blocks to be written to a second device, wherein the information comprises sizes of the plurality of data blocks and a plurality of destination addresses in a memory of the second device where the plurality of data blocks will be written;
    generating a write request for the plurality of data blocks based on the information, wherein the write request indicates at least the plurality of destination addresses and the sizes of the plurality of data blocks; and
    sending the write request to a second network interface card coupled with the second device, so that the plurality of data blocks are written to the plurality of destination addresses in the memory of the second device;
  wherein generating the write request comprises:
    obtaining a data carrying identifier, wherein the data carrying identifier indicates whether the write request comprises the plurality of data blocks; and
    in response to the data carrying identifier indicating that the write request comprises the plurality of data blocks, creating the write request, wherein the write request comprises the header and the plurality of data blocks;
  wherein the write request comprises a header, the header comprises a number of sub-headers and a total size of the plurality of data blocks, and each of the sub-headers comprises a destination address corresponding to one of the plurality of data blocks and a size thereof; and wherein creating the write request further includes:
performing a merge operation that combines multiple preexisting write requests into the write request, wherein each of the sub-headers indicates one of the multiple preexisting write requests, and each of the multiple preexisting write requests indicates one of the plurality of data blocks.

11. The device according to claim 10, wherein obtaining the information comprises:
obtaining an indication about the storage location of the information in the first device; and
obtaining the information from the storage location based on the indication.

12. The device according to claim 10, wherein the actions further comprise:
if a confirmation message for the write request from the second device is received, sending the plurality of data blocks to the second device; and
if a confirmation message for the plurality of data blocks from the second device is received, providing completion information, indicating that the plurality of data blocks are written to the second device, to the first device.

13. The device according to claim 10, wherein the actions further comprise:
obtaining a plurality of source addresses, in a memory of the first device, of the plurality of data blocks; and
based on the plurality of source addresses, obtaining the plurality of data blocks by performing a direct memory access operation.

14. An electronic device, the electronic device comprising:
at least one processor; and
a memory coupled to the at least one processor and having instructions stored thereon, wherein when executed by the at least one processor, the instructions cause the electronic device to perform actions, and the actions comprise:
receiving, at a second network interface card coupled with a second device, a write request for a plurality of data blocks, wherein the write request is received from a first network interface card coupled with a first device and at least indicates sizes of the plurality of data blocks and a plurality of destination addresses in a memory of the second device where the plurality of data blocks will be written; and
based on the sizes of the plurality of data blocks, writing the plurality of data blocks to the plurality of destination addresses in the memory of the second device;
wherein the write request was generated by:
obtaining a data carrying identifier, wherein the data carrying identifier indicates whether the write request comprises the plurality of data blocks; and
in response to the data carrying identifier indicating that the write request comprises the plurality of data blocks, creating the write request, wherein the write request comprises a header and the plurality of data blocks;
wherein the header comprises a number of sub-headers and a total size of the plurality of data blocks, and each of the sub-headers comprises a destination address corresponding to one of the plurality of data blocks and a size thereof; and
wherein the write request was further created by:
performing a merge operation that combines multiple preexisting write requests into the write request, wherein each of the sub-headers indicates one of the multiple preexisting write requests, and each of the multiple preexisting write requests indicates one of the plurality of data blocks.

15. The device according to claim 14, wherein receiving the write request comprises:
obtaining a plurality of sub-headers corresponding to the plurality of data blocks and a total size of the plurality of data blocks from one header of the write request;
obtaining a destination address corresponding to one of the plurality of data blocks and a size thereof from each sub-header of the plurality of sub-headers; and
allocating a storage block corresponding to the total size.

16. The device according to claim 15, wherein the actions further comprise:
determining whether the write request comprises the plurality of data blocks; and
if it is determined that the write request comprises the plurality of data blocks, obtaining the plurality of data blocks from the write request; and
writing the plurality of data blocks to the storage block.

17. The device according to claim 15, wherein the actions further comprise:
if it is determined that the write request does not comprise the plurality of data blocks, sending a confirmation message for the write request to the first network interface card; and
receiving the plurality of data blocks from the first network interface card in order to store in the storage block; and
if the plurality of data blocks are stored in the storage block, sending a confirmation message for the plurality of data blocks to the first network interface card.

18. The device according to claim 14, wherein writing the plurality of data blocks to the plurality of destination addresses comprises:
writing the plurality of data blocks to the plurality of destination addresses in the memory of the second device through a direct memory access operation.

19. A computer program product having a non-transitory computer readable medium which stores a set of instructions to process data; the set of instructions, when carried out by computerized circuitry, causing the computerized circuitry to perform a method of:
obtaining, at a first network interface card coupled with a first device, information related to a plurality of data blocks to be written to a second device, wherein the information comprises sizes of the plurality of data blocks and a plurality of destination addresses in a memory of the second device where the plurality of data blocks will be written;
generating a write request for the plurality of data blocks based on the information, wherein the write request indicates at least the plurality of destination addresses and the sizes of the plurality of data blocks; and
sending the write request to a second network interface card coupled with the second device, so that the plurality of data blocks are written to the plurality of destination addresses in the memory of the second device;
wherein generating the write request comprises:
obtaining a data carrying identifier, wherein the data carrying identifier indicates whether the write request comprises the plurality of data blocks; and
in response to the data carrying identifier indicating that the write request comprises the plurality of data blocks, creating the write request, wherein the write request comprises the header and the plurality of data blocks;

wherein the write request comprises a header, the header comprises a number of sub-headers and a total size of the plurality of data blocks, and each of the sub-headers comprises a destination address corresponding to one of the plurality of data blocks and a size thereof; and wherein creating the write request further includes:
performing a merge operation that combines multiple preexisting write requests into the write request, wherein each of the sub-headers indicates one of the multiple preexisting write requests, and each of the multiple preexisting write requests indicates one of the plurality of data blocks.

20. A computer program product having a non-transitory computer readable medium which stores a set of instructions to process data; the set of instructions, when carried out by computerized circuitry, causing the computerized circuitry to perform a method of:

receiving, at a second network interface card coupled with a second device, a write request for a plurality of data blocks, wherein the write request is received from a first network interface card coupled with a first device and at least indicates sizes of the plurality of data blocks and a plurality of destination addresses in a memory of the second device where the plurality of data blocks will be written; and based on the sizes of the plurality of data blocks, writing the plurality of data blocks to the plurality of destination addresses in the memory of the second device;

wherein the write request was generated by:

obtaining a data carrying identifier, wherein the data carrying identifier indicates whether the write request comprises the plurality of data blocks; and in response to the data carrying identifier indicating that the write request comprises the plurality of data blocks, creating the write request, wherein the write request comprises a header and the plurality of data blocks;

wherein the header comprises a number of sub-headers and a total size of the plurality of data blocks, and each of the sub-headers comprises a destination address corresponding to one of the plurality of data blocks and a size thereof; and wherein the write request was further created by:
performing a merge operation that combines multiple preexisting write requests into the write request, wherein each of the sub-headers indicates one of the multiple preexisting write requests, and each of the multiple preexisting write requests indicates one of the plurality of data blocks.

21. The method according to claim 1, further comprising:
after sending the write request, separately sending the plurality of data blocks to the second network interface card, wherein the plurality of data blocks include a second header identifying the plurality of data blocks as a payload of the write request.

22. The method according to claim 5, further comprising:
after receiving the write request, separately receiving the plurality of data blocks at the second network interface card, wherein the plurality of data blocks include a second header identifying the plurality of data blocks as a payload of the write request.

* * * * *